United States Patent [19]

Thal

[11] 3,724,669
[45] Apr. 3, 1973

[54] SCREEN INSTALLATION
[75] Inventor: Heinz Thal, Lintorf, Germany
[73] Assignee: Ludwig Taprogge, Reinigungsanlagen fur Rohren-Warmeaustauscher, Dusseldorf, Postfach, Germany
[22] Filed: May 20, 1971
[21] Appl. No.: 145,436

[52] U.S. Cl. ............... 210/409, 210/448, 210/460, 210/512
[51] Int. Cl. ............................................. B01d 29/42
[58] Field of Search......210/209, 304, 409, 448, 452, 210/459, 512, 433; 55/336, 431

[56] References Cited

UNITED STATES PATENTS 3,537,593  11/1970  Ruthrof ........................ 210/448 X
3,481,475  12/1969  Ruthrof et al. .................. 210/304

Primary Examiner—Reuben Friedman
Assistant Examiner—F. F. Calvetti
Attorney—Craig, Antonelli and Hill

[57] ABSTRACT

A screen installation for separating solid materials from liquid streams in pipe lines, in which a screen basket is so arranged that its closed end is directed opposite the flow and its open end is connected with the pipe line wall; at least one tangentially outwardly directed flushing medium inlet opening and flushing medium outlet opening each are arranged near the screen base whereby the outlet opening is disposed nearer the screen base while the inlet opening is arranged in another plane disposed upstream of the plane of the outlet opening, as viewed in the direction of the main stream, so that a flushing medium separation channel is formed between the two openings.

33 Claims, 8 Drawing Figures

SCREEN INSTALLATION

The present invention relates to a screen installation for the separation of solid materials from a liquid stream in pipe lines, consisting of a screen basket which is so arranged in the pipe line that its closed end is directed against the direction of flow and its open end is connected with the pipe line wall, with at least one flushing medium inlet and with at least one flushing medium outlet arranged near the screen base and directed tangentially in the outward direction. The screen basket is preferably constructed as cylindrical or conically shaped basket with circular base.

A filter or separator for solid materials from liquids in a pipe line with a conically shaped screen is known in the prior art (German Pat. No. 1,298,506) which is installed into the pipe line with its apex opposite the flow direction of the liquid.

In this known construction, the solid materials practically slide along the inclined plane of the screen surface into a toroidal channel or duct surrounding the screen cone base. An additional annular flow is produced in this channel by means of a pipe connecting piece or stub directed tangentially to the axis of the tore; the additional annular flow thereby seizes the solid materials washed into the channel and carries them off by way of a further tangentially directed pipe connecting piece or stub.

Experiences with screens of the known type of construction, however, reveal that in power plants with mussel growth in the cooling water system, also other contaminants may occur in the cooling water, which have, for example, a fibrous nature, such as, algae, weeds, or a predominantly aerial or flat structure, such as, leaves, or—in recent times ever more frequently— residues of used packing foils. These contaminations do not slide from the screen surface into the toroidal channel but instead settle on and therewith clog the screen surface, beginning at the screen base and from there covering to an everincreasing extent the entire screen surface. Admittedly, one attempts in the prior art separators or filters to impart an angular momentum or swirl to the main flow by means of guide blades at the apex of the screen cone; however, the swirl is able to force solid materials of higher density into the area of the pipe line close to the walls thereof only in the vicinity of the apex of the screen cone. In case of solid materials of the aforementioned fibrous or flat, sheet-like nature whose density hardly differs from that of the cooling water, the deflection plates remain ineffectual.

Therebeyond, the deflection plates entail the disadvantage of unnecessarily increasing the pressure loss of the separator in case of clean screen surfaces whereas with a strong covering of the screen surface, they are only slightly effective by reason of the liquid flow generally decreasing as a result thereof.

Consequently, with the known prior art construction, a cleaning of covered screen surfaces, in case of need, is practically only possible if a closure valve upstream of the separator is closed and the water column remaining in the separator is also put into rotation by the annular flow in the toroidal channel, whereby the solid materials adhering to the screen can be flushed off and after opening of the closure valve, can be carried away. During this flushing operation, one has to operate with relatively large and therewith uneconomical flushing quantities, especially if the closure valve cannot be completely closed by reason of the need for maintaining the main flow.

The present invention is therefore concerned with the task to provide a screen installation, with the aid of which, in addition to solid materials of higher rigidity and higher density which slide off from the screen surface, also solid materials predominantly of fibrous or flat sheet-like structure which adapt themselves to the screen surface and settle thereon, can be separated while the main flow is continuously maintained, with minimum flushing medium quantities and without charging the main stream with a constantly high pressure loss.

The underlying problems are solved by the present invention with a screen installation of the aforementioned type in that the flushing medium outlet or discharge aperture is arranged near the screen base and the flushing liquid inlet aperture is arranged in another plane disposed upstream thereof in the direction of the main stream under formation of a flushing medium circulation channel between the two apertures. The area of the pipe line disposed between the screen base and the plane of the inflow of the flushing medium is therefore enlarged into a flushing medium circulation channel or duct with spirally shaped flushing base extending about the screen surface by reason of the described arrangement of the flushing medium outlet opening and the flushing medium inlet opening.

The present invention is predicated on the discovery that with separators or filters of the aforementioned type the turbulence prevailing between the screen basket and the pipe line generally suffices to separate again and re-detach always types of solid materials of the aforementioned fibrous or sheet-like structure from the screen surface whereby they are conveyed in the direction of the main components of the flow, i.e., in the direction toward the screen base.

Only in the area of the screen base where the turbulence decreases by reason of the narrowing cross section and the flow against the screen surfaces takes place to an ever-increasing extent more steeply, the solid materials settle and increasingly cover the entire free screen surface beginning from the screen base. It is now possible by the measures provided according to the present invention to impart to the main flow or stream within the area of the entire flushing medium circulation channel, a component directed toward the flushing medium outlet connecting pipe and to utilize the flow energy supplied by means of the flushing water as turbulence in direct proximity to the screen surface for the detachment of the solid materials which have settled and adhere thereat. The necessary flushing medium quantities and velocities and therewith the necessary flushing medium energy can be considerably decreased if the cleaning of the screen surface surrounded by the flushing medium circulation channel takes place intermittently by any conventional means and this screen surface during the flushing operation is relieved from the pressure difference between the unfiltered water side and the filtered water side which loads the same.

Further features of the present invention are as follows. According to one proposal of the present invention, which is of particular significance, provision is additionally made that at least one closure member surrounding the screen basket and adjustable with respect thereto is coordinated to the flushing medium inlet aperture upstream thereof or an adjusting device surrounding a guide element, which is arranged in the liquid stream below the screen basket and adjoins the same, and adjustable with respect thereto is coordinated to the flushing liquid outlet aperture downstream thereof or the guide element itself is constructed as a throttling element adjustable relative to the inner wall of the pipe line within the area of the flushing medium inlet and flushing medium outlet aperture. If one operates with a closure element coordinated to the flushing medium circulation channel upstream thereof, then by an increase of the flushing water discharge quantity over and above the flushing medium inlet quantity, a flow directed from the filtered water side to the contaminated water side can be produced through the screen surface to be cleaned, which may considerably enhance the flushing effect. According to the present invention, a spirally shaped flushing medium guide surface or parts thereof extending about the screen basket are provided between the flushing medium inlet opening and the flushing medium outlet opening. In this manner, care is taken to an increased extent that the flushing medium entering into the flushing medium circulation channel is transformed into a swirling movement circulating about the screen basket or its screen surface. Furthermore, the present invention proposes that one or several flushing medium inlet openings be coordinated on the same height or different heights to the flushing medium outlet opening upstream thereof. The proposal of the present invention has particular significance if the closure member is constructed as inflatable body, especially annular inflatable body, whence a closing of the flushing medium circulation channel between screen base and closure member from the main stream is possible at any time without difficulties. The guide element can be constructed as hollow body, for example, as hollow cylinder or hollow conical section adapted to be traversed by the flow or adapted to be circumcirculated, whose cylinder or cone surface is disposed within the area between the flushing medium inlet and flushing medium outlet openings. Additionally, the present invention provides that the guide elements as hollow cylindrical or hollow conically shaped throttling element is adjustable in the direction of the main stream so that the guide element in the throttling position thereof covers the entire screen surface disposed between the flushing medium inlet and flushing medium outlet openings on the filtered water side. Appropriately, a throttle valve adjustable up to a complete closing of the flow cross section is coordinated to the screen basket upstream thereof. The screen basket may thereby be constructed as cylindrical basket with a bottom curved opposite the flow direction or with a conically shaped bottom. Finally, the possibility exists that the closed end of the screen basket is constructed as excess pressure valve.

The advantages attained by the present invention essentially reside in that for the purpose of a completely satisfactory flushing over the entire screen surface of the screen basket, a relatively slight and therewith economic flushing quantity suffices. In that connection, any decrease of the main stream by throttling can be dispensed with so that the screen installation according to the present invention operates with a minimum pressure loss. In particular, the application of the installation of the present invention is not limited to certain types of solid materials but is possible with all types of solid materials occurring in connection with practical cooling water operations.

The advantages described above are achieved in particular because the present invention starts from the recognition that a swirling flow with intensive flushing effect on the screen surface can be maintained also in a flushing circulation channel which is practically open in the direction toward the screen basket. Whereas within the scope of the known constructions contaminations which have settled at and adhere to the screen basket and which have reached the screen base, are merely sucked off by way of a toroidal channel, according to the present invention, an intensive alternating effect of the flushing medium conducted as swirling flow is realized with the screen surface within the area of the flushing medium circulation channel. As a result thereof, contaminants which have deposited on the screen surface are removed and carried off. This removal of deposited contaminants can thereby also be carried out while the screen installation as a whole remains connected in the cooling water circulatory system and fulfills thereat its separating function.

These and further objects, features and advantages of the present invention will become more obvious from the following description when taken in connection with the accompanying drawing which shows, for purposes of illustration only, several embodiments in accordance with the present invention, and wherein.

Figure 1:
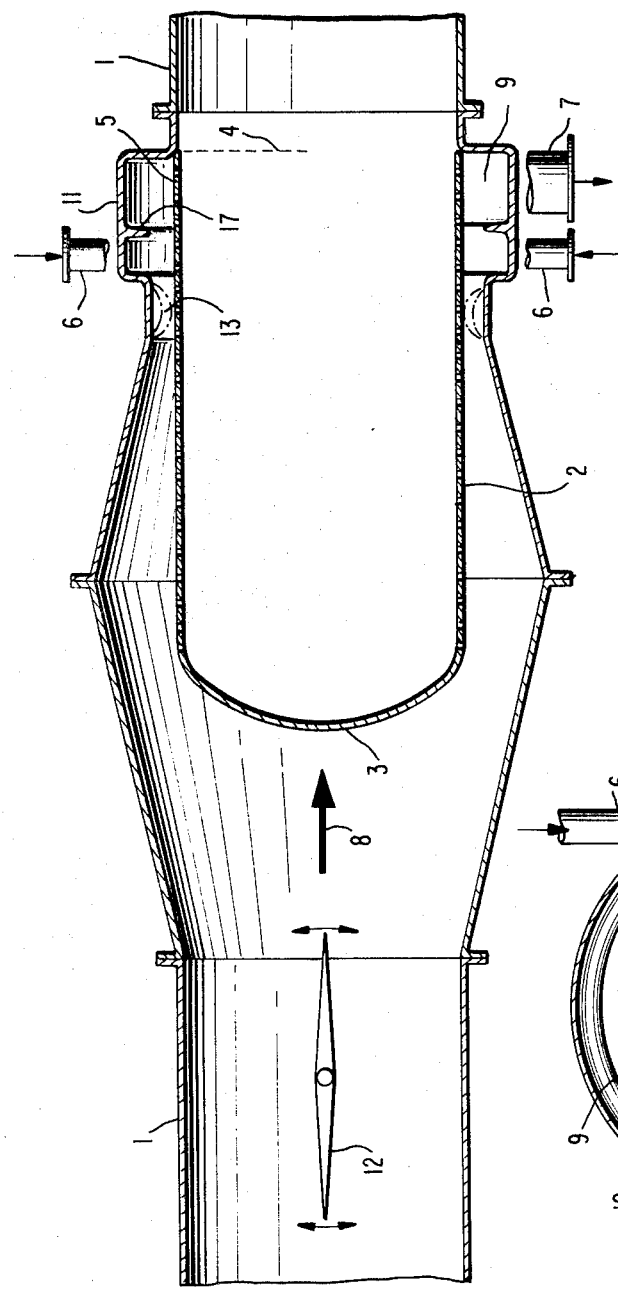
FIG. 1 is a somewhat schematic axial cross-sectional view through a screen installation of the present invention.

Referring now to the drawing wherein like reference numerals are used throughout the various views to designate like parts, a screen installation for the separation of solid materials from liquid streams in pipe lines 1 is illustrated in these figures which essentially consists of a cylindrical or conically shaped screen basket 2 so arranged in the pipe line 1 that its closed end 3 is directed opposite the flow direction and its open end 4 is connected with the pipe line wall, and more particularly with at least one tangentially outwardly directed flushing medium inlet opening 6 and at least one tangentially outwardly directed flushing medium outlet opening 7 arranged near the screen base 5. The flushing medium outlet aperture 7 is arranged near the screen base 5 and the flushing medium inlet apertures 6 are arranged in another plane disposed upstream of the plane of the flushing medium outlet aperture 7, as viewed in the direction of the main stream 8, under formation of a flushing medium circulation channel 9 between the two openings 6 and 7.

The diameter of the flushing medium circulation channel 9 depends, on the one hand, on the number and diameter of the flushing medium inlet openings 6 and is so selected that the flushing medium flow 10 (FIG. 2) is conducted directly along the screen surface; on the other hand, the diameter of the cooling medium circulation channel 9 must be so selected that the solid materials can move freely within the same without being wedged or becoming jammed between the screen surface 2 or the boundary wall 11 (FIG. 1) of the channel 9. The size of the screen surface 2 surrounded by the flushing medium circulation channel 9 depends on the accpetable increase of the pressure loss in the screen installation between two flushing operations. At any rate, the surface should be chosen so large that after a cleaning of the screen surface 2, such a large axial component results in the annular cross section upstream of the flushing medium channel 9 that the solid materials which have been deposited and settled thereat or upstream thereof on the screen surface 2, are transported with certainty into the area of the channel 9. The turbulence within the area upstream of the flushing medium circulation channel 9 may—if necessary—be influenced by adjustment of a throttle valve 12. However, it may also be advantageous to undertake a deflection of the flow in the screen installation itself and therewith to utilize the increase of the turbulence connected therewith for the detachment of the solid materials.

Figure 2:
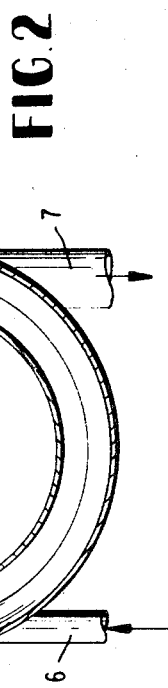
FIG. 2 is a transverse cross-sectional view through the flushing medium circulation channel according to FIG. 1.

A closure member 13 surrounding the screen basket 2 and adjustable with respect thereto is coordinated to the flushing medium inlet opening 6 upstream thereof (FIG. 1).

Figure 3:
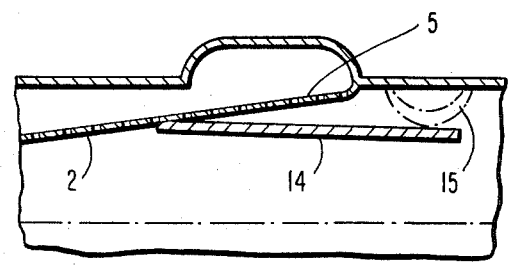
FIGS. 3, 4, 5a and 6 are schematic axial cross-sectional views, similar to FIG. 1, through modified embodiments of screen installations in accordance with the present invention.

However, a closure member 15 (FIG. 3) surrounding a guide element 14, which is arranged in the liquid stream within the screen basket 2 and adjoins the same, and is adjustable with respect thereto, may be coordinated to the flushing medium outlet opening 7 downstream thereof.

In the alternative, the guide element 14 itself may be constructed as a throttling member 16 (FIG. 4) adjustable relative to the inner wall of the pipe line within the area of the flushing medium inlet opening 6 and flushing medium outlet opening 7.

A spiral-like flushing medium line extending about the screen basket 2 or parts thereof are provided between the flushing medium inlet opening 6 and flushing medium outlet opening 7. However, one or several flushing medium inlet openings 6 disposed on the same height or at different heights may be coordinated to the flushing medium outlet opening 7 upstream thereof.

The closure member 13 (FIGS. 1 and 3) is constructed as inflatable element of any conventional construction, especially as annular inflatable element.

The guide body 14 (FIG. 3) is constructed as hollow body adapted to be traversed by the flow or circumcirculated by the flow, for example, as hollow cylinder or as hollow conical section, whose cylinder or cone surface is disposed within the area between the flushing medium inlet openings 6 and flushing medium outlet openings 7.

Figure 4:
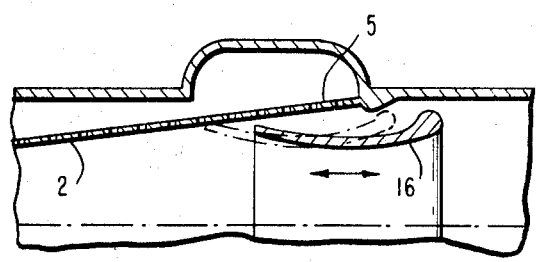
Figures 5A, 5B:
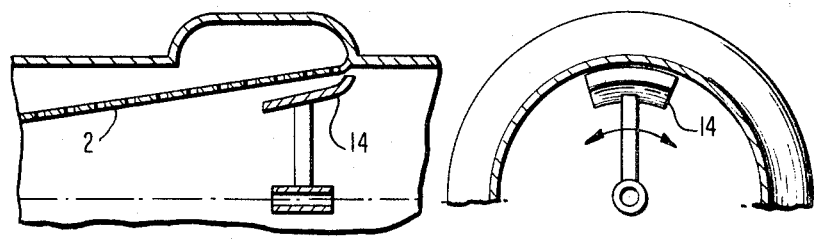
FIG. 5b is a transverse cross-sectional view of the flushing medium circulation channel of FIG. 5a and FIG. 7 is a schematic transverse cross-sectional view through the screen installation according to FIG. 6.

However, the guide element 14 may also be adjustable in the direction of the mainstream 8 as hollow cylindrical or hollow conically shaped throttling element 16 (FIG. 4) so that the guide element 14, 16 in the throttling position thereof shown in FIG. 4 in dash and dottled lines covers the entire screen surface 5 disposed between flushing medium inlet opening 6 and flushing medium outlet opening 7 on the side of the filtered water.

Furthermore, a throttle valve 12 adjustable up to a position effecting the full closing of the flow cross section is coordinated to the screen basket 2 upstream thereof.

Figure 6:
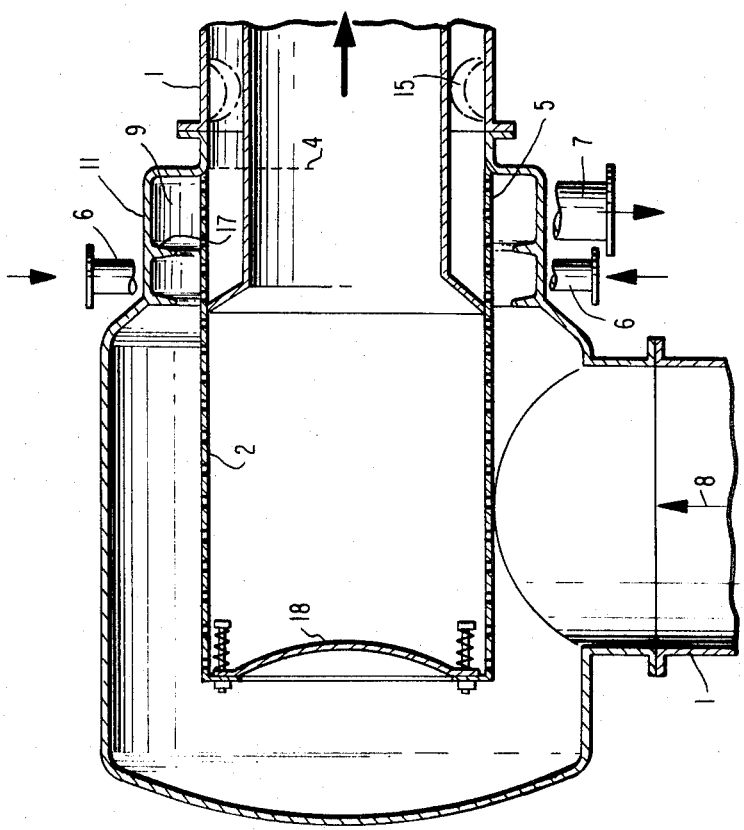
Figure 7:
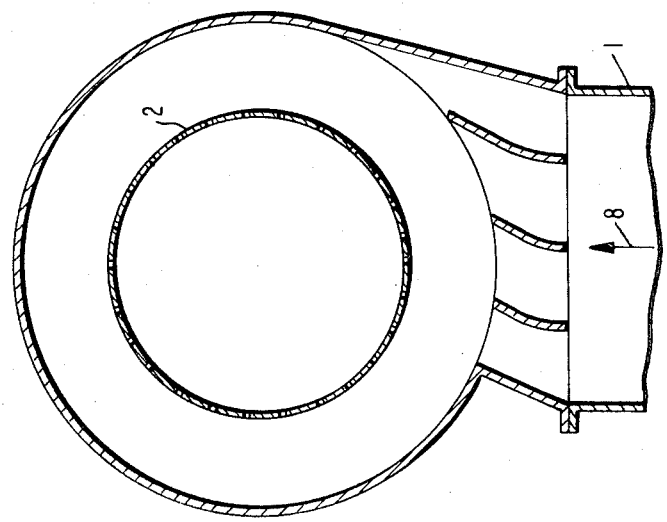

As to the rest, the screen basket 2 may be constructed as cylindrical basket with a bottom 3 curved opposite the flow direction (FIG. 1) or with a conically shaped bottom 3 (not shown). The possibility thereby exists to construct the entire closed end 3 of the screen basket 2 as excess pressure valve 18 (FIG. 6).

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

What we claim is:

1. A screen installation for separating solid materials from liquid streams in pipe line means, which includes a screen basket means having a substantially open and a substantially closed end which is so arranged in the pipe line means that its closed end is directed opposite the flow direction and its open end is connected with walls of the pipe line means, and which is provided with at least one substantially tangentially outwardly directed flushing medium inlet and flushing medium outlet aperture means in proximity to the screen base, characterized in that the flushing medium outlet aperture means is arranged near the screen base and the flushing medium inlet aperture means is arranged in another plane disposed upstream in the direction of the main flow under formation of a flushing medium circulation channel means between the two aperture means.

2. A screen installation according to claim 1, characterized in that at least one closure means surrounding the screen basket means and adjustable with respect thereto is coordinated to the flushing medium inlet aperture means upstream thereof.

3. A screen installation according to claim 1, characterized in that a closure means surrounding a guide means arranged in the liquid flow within the screen basket means and adjoining the same is coordinated to the flushing medium outlet aperture means downstream thereof, said closure means being adjustable with respect to said guide means.

4. A screen installation according to claim 1, characterized by a guide means which is constructed itself as throttling means arranged in the liquid flow within the screen basket means, which is adjustable relative to the inner wall of the pipe line means within the area of at least one of said aperture means.

5. A screen installation according to claim 1, characterized by flushing medium guide surface means extending spiral-like about the screen basket means and provided between the flushing medium inlet aperture means and the flushing medium outlet aperture means.

6. A screen installation according to claim 5, characterized in that the flushing medium guide surface means consist of several individual portions.

7. A screen installation according to claim 1, characterized in that at least one flushing medium inlet aperture means is coordinated to the flushing medium outlet aperture means upstream thereof.

8. A screen installation according to claim 7, characterized in that several flushing medium inlet aperture means are coordinated to the flushing medium outlet aperture means.

9. A screen installation according to claim 8, characterized in that said flushing medium inlet aperture means are arranged substantially at the same height.

10. A screen installation according to claim 8, characterized in that said several flushing medium inlet aperture means are arranged at different heights.

11. A screen installation according to claim 2, characterized in that the closure means is an inflatable closure body.

12. A screen installation according to claim 11, characterized in that said inflatable closure body is an annular inflatable closure body.

13. A screen installation according to claim 3, characterized in that the guide means is constructed as hollow body whose outer surfaces are disposed within the area between the flushing medium inlet and outlet aperture means.

14. A screen installation according to claim 13, characterized in that said guide means is a hollow cylinder.

15. A screen installation according to claim 13, characterized in that said guide means is a hollow conical section.

16. A screen installation according to claim 13, characterized in that said guide means is adapted to be traversed by the flow.

17. A screen installation according to claim 13, characterized in that said guide means is adapted to be circumcirculated by the flow.

18. A screen installation according to claim 4, characterized in that the guide means constructed as hollow throttling means adjustable in the direction of the main stream, in the throttling position thereof, covers substantially the entire screen surface disposed between flushing medium inlet and outlet aperture means on the filtered water side.

19. A screen installation according to claim 18, characterized in that said throttling means is a hollow cylinder.

20. A screen installation according to claim 18, characterized in that said guide means is a hollow conically shaped throttling element.

21. A screen installation according to claim 1, characterized in that a throttle valve adjustable up to the substantially complete closing of the flow cross section is coordinated to the screen basket means upstream thereof.

22. A screen installation according to claim 1, characterized in that the screen basket means is constructed as cylindrical basket.

23. A screen installation according to claim 22, characterized in that the basket means is provided with a bottom curved opposite the flow direction.

24. A screen installation according to claim 22, characterized in that the basket is provided with a bottom conically shaped opposite the flow direction.

25. A screen installation according to claim 24, characterized in that the closed end of the screen basket means is constructed as excess pressure valve means.

26. A screen installation according to claim 8, characterized by flushing medium guide surface means extending spiral-like about the screen basket means and provided between the flushing medium inlet aperture means and the flushing medium outlet aperture means.

27. A screen installation according to claim 26, characterized in that said flushing medium inlet aperture means are arranged substantially at the same height.

28. A screen installation according to claim 26, characterized in that said several flushing medium inlet aperture means are arranged at different heights.

29. A screen installation according to claim 26, characterized in that a throttle valve adjustable up to the substantially complete closing of the flow cross section is coordinated to the screen basket means upstream thereof.

30. A screen installation according to claim 29, characterized in that at least one closure means surrounding the screen basket means and adjustable with respect thereto is coordinated to the flushing medium inlet aperture means upstream thereof.

31. A screen installation according to claim 29, characterized in that a closure means surrounding a guide means arranged in the liquid flow within the screen basket means and adjoining the same is coordinated to the flushing medium outlet aperture means downstream thereof, said closure means being adjustable with respect to said guide means.

32. A screen installation according to claim 29, characterized by a guide means which is constructed itself as throttling means arranged in the liquid flow within the screen basket means, which is adjustable relative to the inner wall of the pipe line means within the area of at least one of said aperture means.

33. A screen installation according to claim 1, characterized in that the closed end of the screen basket means is constructed as excess pressure valve means.

* * * * *